May 2, 1939.                M. MALLORY                    2,156,665
TWO-CYCLE INTERNAL COMBUSTION ENGINE
Filed Feb. 25, 1937
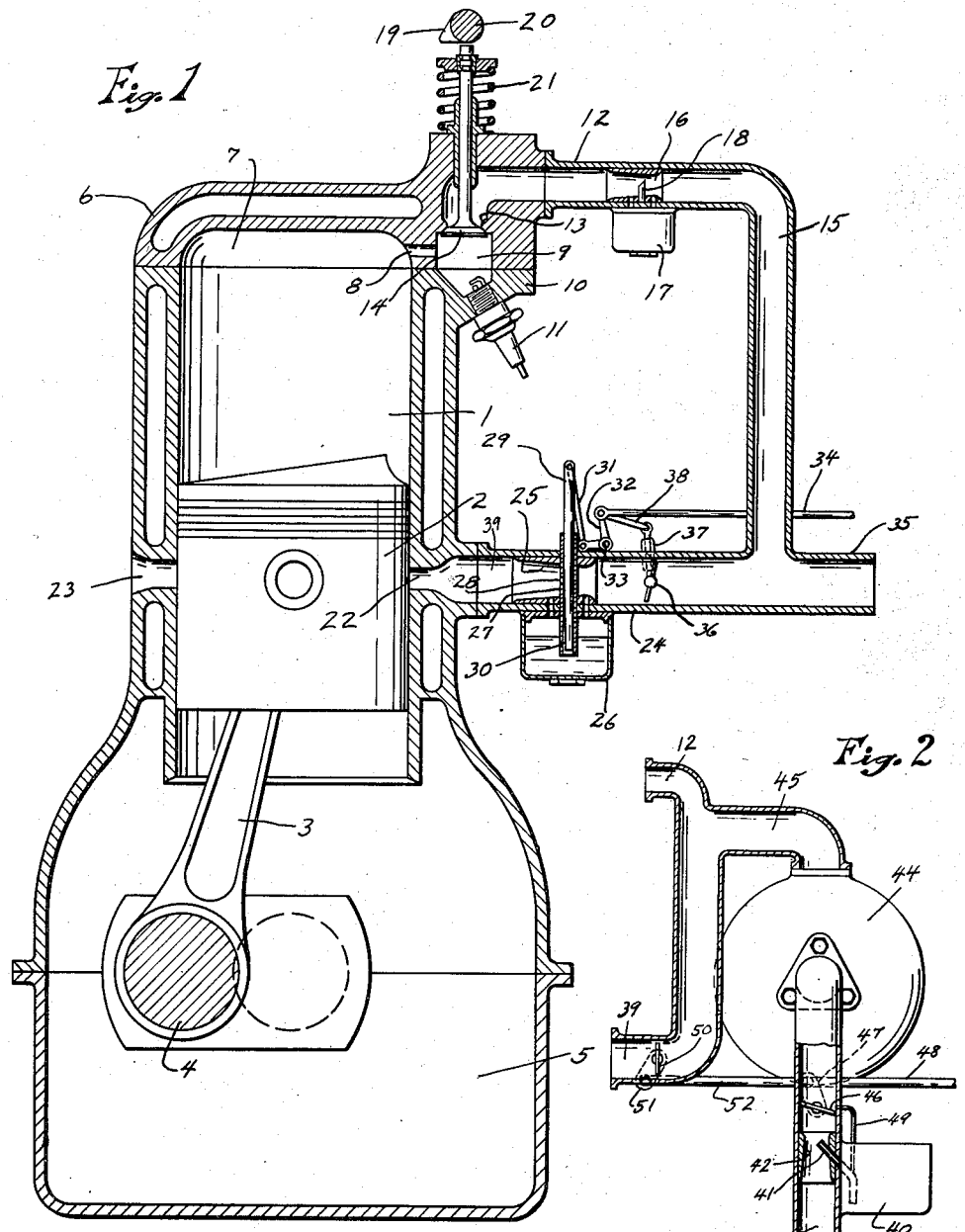

Patented May 2, 1939

2,156,665

UNITED STATES PATENT OFFICE 2,156,665

TWO-CYCLE INTERNAL COMBUSTION ENGINE

Marion Mallory, Detroit, Mich.

Application February 25, 1937, Serial No. 127,725

11 Claims. (Cl. 123—65)

This invention relates primarily to improvements in a two cycle internal combustion engine of the type which includes a spark plug located in a primary firing chamber adjacent the cylinder, said chamber having a restricted communication with the main combustion chamber in the cylinder head, so that the ignition within the primary firing chamber causes a flame to be projected into the upper end of the cylinder to ignite the charge therein.

The primary firing chamber and the main combustion chamber may both be supplied with fuel mixture from the same carburetor, in which case the mixture ratio will be the same in both chambers. If each chamber is supplied from a separate carburetor, two kinds of fuel may be used. For example, a normal combustible mixture of gasoline and air may be supplied to the primary firing chamber and a lean or inferior mixture, or even air alone, may be supplied to the cylinder.

The principal object of the invention is to provide a simple construction whereby the primary firing chamber will be filled with a normal combustible mixture under all operating conditions and electrically ignited under comparatively high compression, whereby a flame of high velocity will be projected into and across the main combustion chamber in the cylinder, thereby causing substantially instantaneous ignition and expansion of any charge which may have been supplied to the cylinder, so that proper operation requires a much smaller spark advance than is used in the conventional engine and the expansion of the gases takes place at a time when the piston is just starting on its downward stroke.

It is also an object of the invention, if the two chambers are charged with different fuel mixtures supplied from different sources, to provide simple means, not requiring valves or the like, to prevent the two mixtures from commingling until the initial ignition occurs.

The invention will be more particularly described in connection with the accompanying drawing, in which:

Fig. 1 is a vertical section taken centrally of one of the engine cylinders and the means for supplying the charges to the cylinder and the primary firing chamber.

Fig. 2 is a similar view showing a modified means for supplying fuel mixture to the engine.

Fig. 1 shows one of the engine cylinders 1, in which a piston 2 is reciprocable by means of a piston rod 3 connected with a crank shaft 4 operating in the usual manner in a crank case 5. The cylinder head 6 is formed with a combustion chamber 7 connected by a restricted port 8 with a firing chamber 9 and beneath this firing chamber the cylinder block is formed with an extension 10 which receives the spark plug 11.

Fuel mixture is supplied to the primary firing chamber 9 from an intake manifold 12 through an inlet port 13 which is controlled by a valve 14. An air passageway 15 leads to the manifold 12 and is provided with a venturi 16 into which a small carburetor 17 discharges fuel through a nozzle 18. The valve 14 is adapted to be opened by a cam 19 disposed on a cam shaft 20, which is driven at crank shaft speed, and to be closed by a spring 21.

It will be noted that there is no valve in the carburetor 17. It is initially adjusted to provide an easily ignitable mixture for the firing chamber 9, from which the flame of the explosion is expelled through the port 8 to fire the charge in the cylinder 1. The charge thus supplied to the chamber 9 is sufficient for normal idling, without any additional supply of fuel to the cylinder.

The main charge of fuel mixture for power is supplied to the cylinder through the manifold 39 and a main intake port 22 which is uncovered by the piston 2 toward the end of its down stroke, shortly after the exhaust port 23 on the opposite side of the cylinder is uncovered.

An air passageway 24 leads to the manifold 39 and is provided with a venturi 25, beneath which is a carburetor 26. A fuel tube 27 extends from the carburetor 26 through the venturi 25 and has a port 28 discharging into the venturi. The rate of fuel discharge is controlled by a metering pin 29 which has a tapered slide 30. The upper end of the pin 29 is connected by a link 31 to a bell crank 32 which is pivotally supported at 33 and controlled by a throttle rod 34. Air may be supplied to the passageways 15 and 24 in any suitable manner. In the present instance, these passageways are both connected to a single conduit 35, which is adapted to be connected to a supply of air under pressure. It is desirable, but not essential, for the passageway 24 to be provided with an air valve 36 which has an arm 37 connected by a link 38 to the throttle rod 34, so that when the metering pin is raised, the air valve will be opened. Without the valve 36, if the air were supplied under low pressure when the engine is idling, the pressure in the venturi 16 might drop too low to draw fuel from the nozzle 18, but if the valve 36 partly closes the passageway 24, the pressure through the venturi 16 will be increased.

On the other hand, if the valve 36 is substantially large enough to close the passageway 24 when the throttle is moved to idling position, the metering pin 29 may be omitted. Then with the valve 36 closed, no air would pass through the passageway 24 and hence no fuel would be drawn from the carburetor 26, but if the valve were progressively opened, more and more air would flow through the passageway 24 and more fuel would be drawn from the carburetor 26.

The carburetor 17 and the venturi 16 are of such size and the valve 14 opens to such an extent that a charge suitable for idling is always supplied to the firing chamber 9. This charge fills the firing chamber and possibly overflows through the restricted port 8 into the cylinder. The port 8 is restricted more than the passageway through the carburetor 17 and more than the port 13 when the valve 14 is open, so that pressure is built up in the chamber 9. This prevents the inferior mixture of air from the main intake port 22, when the latter is open, from flowing into the chamber 9 to dilute the idling or firing charge therein. No valve or other device is necessary for controlling the flow through the port 8.

It will thus be apparent that the mixture in the firing chamber 9 will be substantially uniform under all operating conditions. This, in addition to the location of the spark plug gap where the heavy ends of the mixture will always fall downwardly into the gap, insures efficient ignition at all times.

The ignition will be in two stages. First, the charge in the chamber 9 will be electrically ignited. The burning gases, forced at a high velocity through the port 8 into and across the combustion chamber in the cylinder, will then almost instantaneously ignite the charge in the cylinder, causing the expansion to be much more rapid and at a time when the piston is just starting on its downward or power stroke.

In the modification shown in Fig. 2, in which only one kind of fuel is used, charges having the same mixture ratio are supplied to both manifolds 12 and 39 from a single carburetor 40, which is located on the atmospheric side of the blower 44 and discharges through a nozzle 41 into a venturi 42 having an air intake 43. The outlet 45 from the blower has branches leading to the respective manifolds 12 and 39.

The throttle valve 46 is located between the nozzle 41 and the blower 44 and is provided with an arm 47 connected to the usual throttle rod 48. An idling by-pass 49 opens into the blower intake passageway just above the throttle valve 46.

I have shown a valve 50 in the passageway leading to the manifold 39. This valve has an arm 51 connected by a link 52 to the arm of the throttle valve 46, so that the two valves open and close in synchronism. The valve 50, however, is small enough to allow a limited amount of fuel mixture to pass the same when it is closed, to replace the residual gases in the cylinder. The function of the valve 50 is to increase the pressure of the charge supplied to the primary firing chamber 9 for idling, so that said chamber will be completely filled. Of course this valve may be omitted, if desired.

In this engine, the main power charge is admitted to the cylinder through the port 22 toward the end of the power stroke, immediately after the exhaust port 23 is uncovered, and it is this charge which is the principal means for scavenging the cylinder.

In the construction shown in Fig. 1, the charge supplied to the primary firing chamber 9 invariably fills the same and is sufficient for idling, even if air alone is supplied to the cylinder through the port 22. As the throttle is opened for power, a progressively increasing amount of fuel is metered to the cylinder. The restriction of the port 8 is such that pressure will be built up in the chamber 9, and although some of the mixture from the chamber 9 may overflow into the cylinder, there will be substantially no back flow from the cylinder into said chamber.

Either fuel oil or gasoline may be used in the carburetor 26 with a leaner mixture and consequently with greater economy than in the conventional engine. The mixture in the cylinder may be too lean to be ignited by a spark plug and yet it would be completely ignited and rapidly expanded by the flame projected from the chamber 9.

With the fuel supply means shown in Fig. 2, the operation is substantially the same as in Fig. 1. Since the carburetor 40 supplies the same fuel mixture to both the cylinder and the chamber 9, it is not necessary to keep them segregated, as it is when an inferior mixture is supplied to the cylinder. However, it is important that the chamber 9 be filled with the fuel mixture, which must be under comparatively high compression when ignition occurs in order to insure the best results. This insures the projection of the flame at a high velocity into and across the top of the cylinder, resulting in almost instantaneous and complete ignition in the cylinder, as in Fig. 1.

It is to be understood that other means may be used for supplying fuel mixture to the cylinder and to the chamber 9 without departing from the scope of the invention, provided that the chamber 9 is filled with a normal combustible mixture and operated at a sufficiently high compression to insure complete and substantially instantaneously combustion and expansion of the charge in the cylinder.

Having thus described the invention, what I claim as new and desire to secure by Letters Patent, is:

1. A two-cycle engine comprising a cylinder with a piston reciprocable therein, a primary firing chamber with a port communicating with the upper end of the cylinder, means for delivering a substantially constant charge to said chamber suitable for idling, and means for charging said cylinder with air or fuel mixture as the piston is near the lower end thereof, said cylinder charging means including a passageway with a venturi, a carburetor with a fuel duct opening into the venturi, a throttle valve in said passageway, and a metering pin in said duct and operated in conjunction with said throttle valve.

2. A two-cycle engine comprising a cylinder with a piston reciprocable therein, a primary firing chamber with a port communicating with the upper end of the cylinder, means for delivering a substantially constant charge to said chamber suitable for idling, means for charging said cylinder with air or fuel mixture as the piston is near the lower end thereof; said cylinder charging means including a passageway with a venturi, a carburetor with a fuel duct opening into the venturi, a throttle valve in said passageway, and a metering pin in said duct and operated in conjunction with said throttle valve; means for maintaining a higher pressure in said chamber than in the cylinder, and means for igniting the charge in said chamber, thereby providing a pilot lighter for the charge in the cylinder.

3. A two-cycle engine comprising a cylinder with a piston reciprocable therein, a primary firing chamber with a port communicating with the upper end of the cylinder, means for delivering a substantially constant charge to said chamber suitable for idling, means for charging said cylinder with air or fuel mixture as the piston is near the lower end thereof; said cylinder charging means including a passageway with a venturi, a carburetor with a fuel duct opening into the venturi, a throttle valve in said passageway, and a metering pin in said duct and operated in conjunction with said throttle valve; said communicating port being more restricted than the charge supply passage leading to said chamber, whereby a higher pressure is maintained in said chamber than in the cylinder, and means for igniting the charge in said chamber, thereby providing a pilot lighter for the charge in the cylinder.

4. A two-cycle engine comprising a cylinder, a primary firing chamber in constant communication therewith through a restricted port, means for filling said chamber with a normal fuel mixture charge suitable for idling, means for charging the cylinder directly, means for varying the cylinder charge without materially varying the charge to said chamber, and electrical means for igniting the charge in said chamber, thereby projecting the flame therefrom through said restricted port into and across the top of the cylinder, causing substantially instantaneous ignition and expansion of the charge in the cylinder.

5. A two-cycle engine comprising a cylinder, a primary firing chamber in constant communication therewith through a restricted port, means for filling said chamber with a normal fuel mixture charge suitable for idling, means for supplying the cylinder directly with a charge of the same mixture ratio and from the same source as the charge to said chamber, means for increasing the volume of the cylinder charge without materially changing the volume of the charge to said chamber, and electrical means for igniting the charge in said chamber, thereby projecting the flame therefrom through said restricted port into and across the top of the cylinder, causing substantially instantaneous ignition and expansion of the charge in the cylinder.

6. A two-cycle engine comprising a cylinder with an intake port, a primary firing chamber having a restricted port opening into said cylinder and also having an intake port, a single carburetor for supplying fuel mixture of the same mixture ratio to both intake ports, a blower between the carburetor and the two intake ports, the supply of fuel mixture to said chamber being of sufficient volume under all operating conditions to fill the same under pressure, and electrical means for igniting the charge in said chamber, thereby projecting the flame therefrom through said restricted port into and across the top of the cylinder and causing substantially instantaneous ignition and expansion of the charge in the cylinder.

7. A two-cycle engine comprising a cylinder with an intake port, a primary firing chamber having a restricted port opening into said cylinder and also having an intake port, a single carburetor for supply fuel mixture of the same mixture ratio to both intake ports, a blower between the carburetor and the two intake ports, the supply of fuel mixture to said chamber being of sufficient volume under all operating conditions to fill the same under pressure, means for increasing the volume of the cylinder charge without materially changing the volume of the charge to said chamber, and electrical means for igniting the charge in said chamber, thereby projecting the flame therefrom through said restricted port into and across the top of the cylinder and causing substantially instantaneous ignition and expansion of the charge in the cylinder.

8. A two-cycle engine comprising a cylinder with a piston reciprocable therein, a primary firing chamber with a constantly open port communicating with the upper end of the cylinder, a main intake port to the cylinder, which is uncovered by the piston as the latter approaches the end of its downward stroke, means for delivering a charge to said chamber suitable for idling, means including a throttle for selectively charging the cylinder through the main intake port with a variable fuel mixture or air alone, said communicating port being more restricted than the charge supply passage leading to said chamber, whereby a higher pressure is maintained in said chamber than in the cylinder, means for increasing the proportionate pressure of the charge to the firing chamber as compared to the pressure of the charge through the main intake port when the latter is reduced, and means for igniting the charge in said chamber, thereby providing a pilot lighter for the charge in the cylinder.

9. A two-cycle engine comprising a cylinder with a piston reciprocable therein, a primary firing chamber with a constantly open port communicating with the upper end of the cylinder, a main intake port to the cylinder, which is uncovered by the piston as the latter approaches the end of its downward stroke, and means for selectively charging said cylinder through the main intake port with fuel mixture or air alone, said cylinder charging means including a carburetor having an air supply passageway with a throttle valve therein, said air supply passageway having a branch on the atmospheric side of the throttle valve, with a second carburetor supplying said firing chamber with an unthrottled mixture which is substantially constant and suitable for idling.

10. A two-cycle engine comprising a cylinder with a piston reciprocable therein, a primary firing chamber with a constantly open port communicating with the upper end of the cylinder, a main intake port to the cylinder, which is uncovered by the piston as the latter approaches the end of its downward stroke, an air supply conduit having branches leading to the firing chamber and the main intake port respectively, with an independent carburetor for each branch, a throttle valve and metering device controlling the charge to the main intake port, said throttle valve being located between the main intake port and the branch leading to said chamber, and means for igniting the charge in said chamber, thereby providing a pilot lighter for the charge in the cylinder.

11. A two-cycle engine comprising a cylinder with a piston reciprocable therein, a primary firing chamber with a constantly open port communicating with the upper end of the cylinder, a main intake port to the cylinder, which is uncovered by the piston as the latter approaches the end of its downward stroke, means including a fuel metering device and throttle for selectively charging the cylinder through the main intake port with fuel mixture or air alone, means for delivering an unmetered and unthrottled charge of fuel mixture to the primary firing chamber suitable for idling, and means for igniting the charge in said chamber, thereby providing a pilot lighter for the charge in the cylinder.

MARION MALLORY.